U
nited States Patent Office 3,260,717
Patented July 12, 1966

3,260,717
NOVEL SUBSTITUTED PHENOTHIAZINES
Paul N. Craig, Roslyn, Pa., assignor to Smith Kline & French Laboratories, Philadelphia, Pa., a corporation of Pennsylvania
No Drawing. Filed May 23, 1963, Ser. No. 282,577
6 Claims. (Cl. 260—243)

This application is a continuation-in-part of application Serial No. 102,124, filed April 11, 1961, now U.S. Patent 3,107,242.

This invention relates to novel pentafluorosulfur substituted 10-aminoalkylated phenothiazine derivatives which are useful as tranquilizers, antiemetics, antihistamines, potentiators and general central nervous system depressants.

The novel pentafluorosulfur substituted phenothiazines of this invention are represented by the following general structural formula:

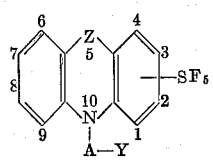

where Z is S, SO or $SO_2$, advantageously S; A is an alkylene chain of from 2 to 6 carbon atoms, straight or branched; and Y is dialkylamino (the alkyl moieties having from 1 to 6 carbon atoms) or a monocyclic heterocyclic amino moiety containing from 4 to 12 carbon atoms, and containing a maximum of two hetero ring members selected from the group of oxygen, nitrogen and sulfur, such as pyrrolidino, morpholino, thiamorpholino, piperidino or N′-substituted-N-piperazino, for example, N′-methyl, hydroxyethyl, acetoxyethyl or hydroxyethoxyethyl-N-piperazino. Also, the phenothiazine nucleus may be substituted further with a halogen, alkyl, alkoxy, alkylthio or trifluoromethyl group. The term aminoalkyl is used generically herein to include both the dialkylaminoalkyl and heterocyclic aminoalkyl moieties as set forth for Formula I above.

The 2-pentafluorosulfurphenothiazine compounds of Formula I are especially advantageous.

The 10-aminoalkylated pentafluorosulfurphenothiazines are prepared from the pentafluorosulfurphenothiazines of Formula II which in turn are prepared as shown by the following synthetic scheme:

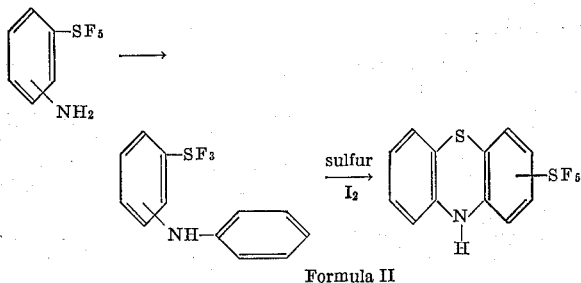

Formula II

Thus, the aminophenylsulfur pentafluoride (obtained by catalytic reduction of the corresponding nitro compound) is acetylated with acetic anhydride and the resulting acetamide is condensed with bromobenzene under alkaline conditions and in the presence of cuprous iodide and copper-bronze powder, and then hydrolyzed with concentrated mineral acid to give the diphenylamine. The latter compound is then thionated to give the phenothiazine. In this step, the substituted diphenylamine is heated with from 1.8 to 2.0 equivalents of sulfur in the presence of a catalytic amount of iodine, for instance from 0.5 to 5.0% by weight of the diphenylamine. The reaction mixture is advantageously heated at from about 120–230° C. for from one-quarter to five hours. The reaction may be run with or without a solvent. Exemplary of suitable, nonreactive organic solvents are xylene or o-dichlorobenzene. Preferably the reaction is run without a solvent in an atmosphere of dry nitrogen at from 140–190° C. for from one to three hours. The product is isolated by dissolving the reaction mixture in boiling benzene and then removing the solvent in vacuo. The residue is purified by recrystallization and/or vacuum sublimation.

The sulfoxide derivatives of Formula II are prepared conveniently by oxidizing the phenothiazine in an unreactive solvent such as methanol, ethanol or water with one equivalent of an oxidizing agent, preferably 30% hydrogen peroxide solution at a temperature up to the reflux temperature of the reaction mixture.

The corresponding sulfone derivatives are prepared by oxidizing the phenothiazine in glacial acetic acid with at least two equivalents of an oxidizing agent, preferably an excess of 30% hydrogen peroxide solution at a temperature up to 50° C.

The pentafluorosulfurphenothiazine of Formula II is condensed with a reactive tertiary aminoalkyl ester having the desired dialkylaminoalkyl or heterocyclic aminoalkyl group to form the desired 10-aminoalkyl pentafluorosulfurphenothiazine of Formula I. Preferably the condensation is carried out by reacting the aminoalkyl chloride or bromide with the phenothiazine at a temperature of from 30–160° C. in an unreactive solvent such as benzene, toluene or xylene for from 30 minutes to 36 hours. A suitable acid-binding agent is employed usually, for example an alkali metal amide, preferably sodium, lithium or potassium amide.

The preferred method of alkylation is to react the pentafluorosulfurphenothiazine with an aminoalkyl chloride or bromide with a slight excess of sodium or potassium amide in refluxing benzene or toluene for from 3 to 12 hours.

The alkylated phenothiazine product is isolated by diluting the reaction mixture with water, extracting the organic layer with dilute hydrochloric acid, neutralizing the acid extract and extracting again with benzene. The dried benzene extract is evaporated to give the desired product.

The following examples illustrate the preparation of the 10-aminoalkylated pentafluorosulfurphenothiazines of this invention and as such are not to be construed as limiting the scope set forth in Formula I above.

*Example 1*

Twenty-three grams of m-nitrophenylsulfur pentafluoride in 125 ml. of glacial acetic acid is hydrogenated (70 p.s.i.) at room temperature for two hours in the presence of 0.6 g. of platinum oxide. After the theoretical amount of hydrogen is taken up, the catalyst is removed and 12.0 g. of acetic anhydride is added. The solution is kept at room temperature for 60 hours and then heated at 50–75° C. for six hours. The solvent is removed in vacuo and the residue recrystallized to give m-acetamidophenylsulfur pentafluoride, M.P. 135–136.5° C.

A mixture of 18.2 g. of the above acetamide, 22.0 g. of bromobenzene, 10.5 g. of anhydrous granular potassium carbonate, 0.4 g. of cuprous iodide and 0.4 g. of copper-bronze powder in 70 ml. of nitrobenzene is stirred and heated at 185–205° C. (internal temperature) for twenty hours. The solvent is removed with steam and the separated residue is refluxed for four and one-half hours with a solution of 25 ml. of concentrated hydrochloric acid in 50 ml. of ethanol. The mixture is evaporated almost to dryness in vacuo, diluted with 10% sodium hydroxide solution and then extracted with ether. The ether extract is treated with charcoal, filtered and the solvent is removed under reduced pressure. The residue is vacuum distilled using a 6″ Vigreux column to give 3-pentafluorosulfurdiphenylamine, B.P. 116° C. at less than 0.1 mm.

A mixture of 3.0 g. of 3-pentafluorosulfurdiphenylamine, 0.6 g. of sublimed sulfur and 90 mg. of iodine under nitrogen is heated in a bath at 170–180° C. for 1.75 hours. The reaction mixture is taken up in boiling benzene, treated with charcoal and the solvent subsequently removed in vacuo. Trituration of the residue with petroleum ether gives 2-pentafluorosulfurphenothiazine which after sublimation at 140° C. below 0.1 mm. and recrystallization melts at 186.5–187.5° C.

A suspension of 32.4 g. of 2-pentafluorosulfurphenothiazine and 4.1 g. of sodamide in 150 ml. of dry toluene is stirred vigorously and heated at reflux for one hour. A solution of 14.5 g. of 3-chloro-1-dimethylaminopropane in 25 ml. of toluene is then added slowly and the mixture refluxed for four hours. Water is slowly added to the cooled reaction mixture and the separated toluene layer is extracted with dilute hydrochloric acid. The acid extract is neutralized, extracted with benzene and the dried organic extract evaporated to yield 10-(3′-dimethylaminopropyl) - 2 - pentafluorosulfurphenothiazine. The hydrochloride is prepared by treating the free base with ethereal hydrogen chloride.

*Example 2*

A mixture of 16.2 g. of 2-pentafluorosulfurphenothiazine (prepared as in Example 1), 2.5 g. of sodamide and 10.5 g. of 1-(3′-chloropropyl)-4-methylpiperazine in 200 ml. of xylene is stirred and refluxed for five hours. The reaction mixture is treated with water and the xylene layer extracted with dilute hydrochloric acid. The acid extract is neutralized with aqueous ammonia and the product taken up in benzene. Removal of the solvent yields 10-[3′-(4″-methyl - 1″ - piperazinyl) - propyl] - 2 - pentafluorosulfurphenothiazine. Treating the free base with maleic acid in ethyl acetate solution gives the dimaleate salt.

*Example 3*

A mixture of 1.0 g. of 2-pentafluorosulfurphenothiazine (prepared as in Example 1) and 1 mole equivalent of hydrogen peroxide supplied by 30% hydrogen peroxide solution in 25 ml. of methanol is refluxed for 10 hours. The volatiles are removed in vacuo to leave the 2-pentafluorosulfurphenothiazine-5-oxide.

*Example 4*

A mixture of 1.0 g. of 2-pentafluorosulfurphenothiazine (prepared as in Example 1), 3 mole equivalents of hydrogen peroxide supplied by 30% hydrogen peroxide solution and 15 ml. of glacial acetic acid (containing 0.1 ml. of sulfuric acid) is warmed at 40° C. for 24 hours. Water is then added and the cooled mixture made strongly alkaline with sodium hydroxide solution. This mixture is extracted with benzene and the solvent removed subsequently to yield 2-pentafluorosulfurphenothiazine-5,5-dioxide.

*Example 5*

Following the procedures of Examples 1 and 2, equivalent amounts of 2-pentafluorosulfurphenothiazine or its 5-oxide or 5,5-dioxide and the following tertiary aminoalkyl esters are condensed to give the corresponding 10-aminoalkyl pentafluorosulfurphenothiazine products:

3-bromo-1-diethylaminopropane
3-chloro-2-methyl-1-dimethylaminopropane
1-(3′-chloro-2′-methylpropyl)-4-methylpiperazine
2-chloro-1-dimethylaminopropane
3-bromo-1-pyrrolidinylpropane
2-chloro-1-diethylaminoethane
3-bromo-1-piperidylpropane
3-bromo-1-morpholinylpropane
3-bromo-1-thiamorpholinylpropane

*Example 6*

A suspension of 6.5 g. of 2-pentafluorosulfurphenothiazine, 0.8 g. of sodium amide and 5.1 g. of N-carbethoxy-N′-(3-chloropropyl)-piperazine in 125 ml. of toluene is heated at reflux for four hours. Working up the reaction mixture as in Example 2 gives 10-[3′-(N-carbethoxypiperazinyl)-propyl]-2-pentafluorosulfurphenothiazine.

A solution of 3.2 g. of the above free base in 25 ml. of aqueous ethanol and 1.5 ml. of 40% sodium hydroxide solution is heated at reflux for four hours. The solvent is removed in vacuo and the residue treated with benzene and water. The dried organic layer is evaporated to give the product, 10-(3′-piperazinylpropyl)-2-pentafluorosulfurphenothiazine.

*Example 7*

One equivalent of ethylene oxide is added to a solution of 13.0 g. of 10-(3′-piperazinylpropyl)-2-pentafluorosulfurphenothiazine (prepared as in Example 6) in 50 ml. of methanol and the mixture heated at reflux for one and one-half hours. The solvent is removed in vacuo to give the residual 10-[3′-(N-hydroxyethylpiperazinyl)-propyl]-2 - pentafluorosulfurphenothiazine. This hydroxyethyl compound dissolved in benzene is acylated with 4.0 g. of acetyl chloride in 20 ml. of benzene by refluxing for 20 minutes. The solvents are removed in vacuo to give 10-[3′ - (N - acetoxyethylpiperazinyl) - propyl] - 2 - pentafluorosulfurphenothiazine hydrochloride. Treating an alcoholic solution of the hydrochloride with isopropanolic hydrogen chloride yields the dihydrochloride salt.

*Example 8*

A suspension of 19.5 g. of 10-(3′-piperazinylpropyl)-2-pentafluorosulfurphenothiazine, 8.4 g. of 2-bromo-2′-hydroxyethyl ether and 8.3 g. of potassium carbonate in 250 ml. of toluene is refluxed for six hours. The reaction mixture is treated with water, the organic layer treated with acid, made basic and re-extracted. Evaporation of the extracts yields 10-[3′-(N-hydroxyethoxyethylpiperazinyl)-propyl]-2-pentafluorosulfurphenothiazine.

What is claimed is:

1. A chemical compound of the class consisting of a free base and its nontoxic acid addition salts, the free base having the formula:

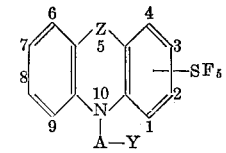

in which:

Z is a member selected from the group consisting of S, SO and $SO_2$;

Y is a member selected from the group consisting of dimethylamino, pyrrolidinyl, piperidinyl, piperazinyl, morpholinyl, thiamorpholinyl, N-methylpiperazinyl, N-hydroxyethylpiperazinyl, N - acetoxyethylpiperazinyl and N-hydroxyethoxyethylpiperazinyl; and A is an alkylene chain of from 2 to 6 carbon atoms and separating the nitrogen to which it is attached by at least 2 carbon atoms.

2. A chemical compound of the formula:

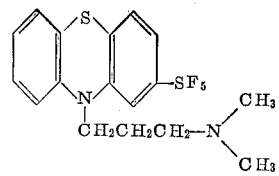

3. A chemical compound of the formula:
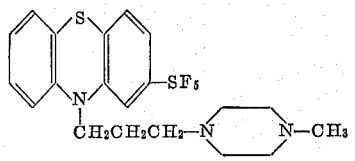
4. A chemical compound of the formula:
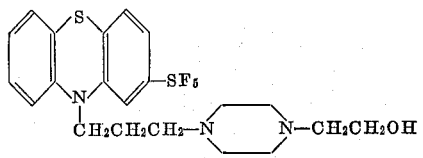
5. A chemical compound of the formula:
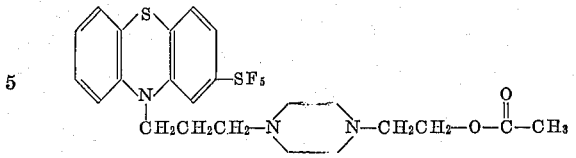
6. A chemical compound of the formula:
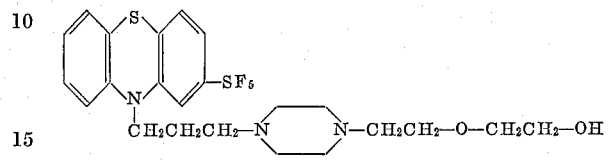
No references cited.
WALTER A. MODANCE, *Primary Examiner.*
J. D. RANDOLPH, *Assistant Examiner.*